(12) United States Patent
Yang et al.

(10) Patent No.: US 12,093,027 B1
(45) Date of Patent: Sep. 17, 2024

(54) RECOGNITION METHOD AND SYSTEM FOR SAFETY BEHAVIORS IN INDUSTRIAL CONTROL SYSTEM FOR GAS FIELD

(71) Applicant: Southwest Petroleum University, Chengdu (CN)

(72) Inventors: Li Yang, Chengdu (CN); Junlin Liu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/588,078

(22) Filed: Feb. 27, 2024

Related U.S. Application Data

(63) Continuation of application No. PCT/CN2024/076038, filed on Feb. 5, 2024.

(30) Foreign Application Priority Data

Jun. 2, 2023 (CN) .......................... 202310651887.X

(51) Int. Cl.
*G05B 23/02* (2006.01)

(52) U.S. Cl.
CPC ....... *G05B 23/0275* (2013.01); *G05B 23/024* (2013.01)

(58) Field of Classification Search
CPC ............ G05B 23/0275; G05B 23/0245; G05B 23/0205; G05B 23/0259; G05B 23/024
See application file for complete search history.

(56) References Cited

U.S. PATENT DOCUMENTS

2017/0270299 A1* 9/2017 Kim ...................... G06F 21/566

FOREIGN PATENT DOCUMENTS

| CN | 111881446 A | * | 11/2020 | ........... G06F 21/563 |
| CN | 114417341 A | * | 4/2022 | |
| CN | 115114627 A | * | 9/2022 | |

OTHER PUBLICATIONS

Chuang, H. Y. et al., "Malware Detection and Classification Based on Graph Convolutional Networks and Function Call Graphs", IT Professinal, vol. 25, No. 3, May-Jun. 2023, pp. 43-53.*

(Continued)

*Primary Examiner* — Manuel L Barbee
(74) *Attorney, Agent, or Firm* — Zhigang Ma

(57) ABSTRACT

A recognition method for safety behaviors in an industrial control system for a gas field and a recognition system thereof are provided. The recognition method includes: S1, collecting sample data of the industrial control system, and obtaining an analysis report based on the sample data; S2, generating a critical application programming interface (API) call dependency graph and a resource dependency graph based on the analysis report; S3, converting the critical API call dependency graph and the resource dependency graph into numerical matrixes; S4, constructing a detection model according to the numerical matrixes, and then detecting a program abnormal behavior of an industrial control host program based on the detection model, to obtain a recognition result, and the recognition result is a normal behavior or an abnormal behavior. The recognition method and system address issues such as high resource occupancy, timeliness, and inaccuracy in safety behavior recognition for industrial control system.

5 Claims, 1 Drawing Sheet

(56) References Cited

OTHER PUBLICATIONS

Kong, Zixu et al., "Automatic Generation of Mobile Application Behavior Statement Template BAsed on API Call Graph", 2022 4th International Academic Exchange Conference on Science and Technology Innovation, 2022, pp. 1358-1363.*

CNIPA, Notification of First Office Action for CN202310651887.X, Nov. 1, 2023.

Southwest Petroleum University (Applicant), Reply to Notification of First Office Action for CN202310651887.X, w/(allowed) replacement claims, Nov. 16, 2023.

CNIPA, Notification to grant patent right for invention in CN202310651887.X, Nov. 23, 2023.

* cited by examiner

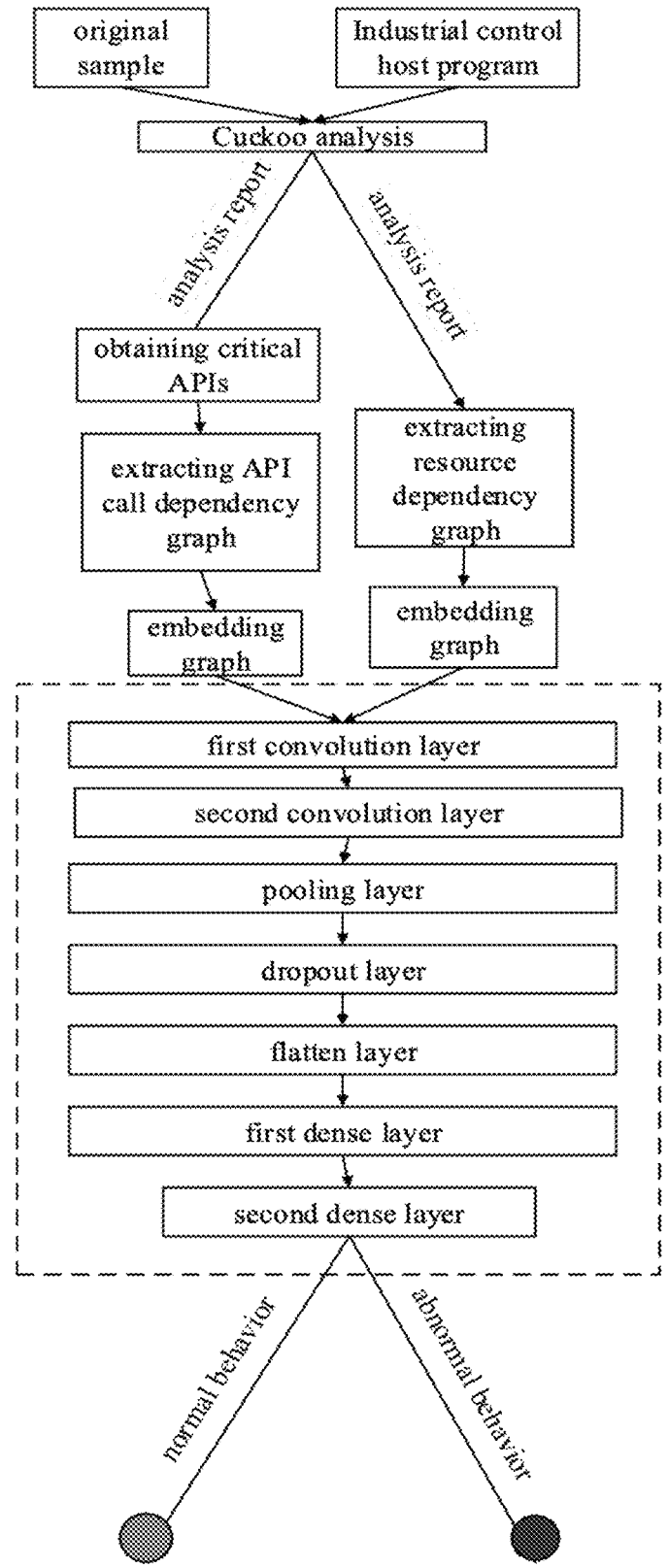

RECOGNITION METHOD AND SYSTEM FOR SAFETY BEHAVIORS IN INDUSTRIAL CONTROL SYSTEM FOR GAS FIELD

TECHNICAL FIELD

The disclosure relates to the field of security technologies of industrial control systems, and particularly to a recognition method and system for safety behaviors in an industrial control system for a gas field.

BACKGROUND

Since availability, functional integrity, and real-time control are the most important characteristics of industrial control systems, the first step in securing industrial control systems is to ensure their functional integrity and real-time control. One of the main reasons for the lack of defense means of the industrial control systems is that most of security defense technologies of the traditional information technology (IT) systems and the traditional IT systems cannot be transplanted to the industrial control systems. Therefore, it is necessary to develop applicable information security technologies and products for the characteristics of the industrial control systems.

The biggest threat to the industrial control systems of gas fields is organized attack threats both domestically and internationally, which are extremely destructive. The traditional malicious code defending technology relies on manual analysis to extract feature codes and store them in a feature library. When it is necessary to detect industrial control host programs, the extracted feature codes are compared with the industrial control host programs and are detected. However, the traditional malicious code defending technology still has problems in detecting potential threats as soon as possible and eliminating threats in a timely and accurate manner under a condition of ensuring availability, completeness, and confidentiality. Therefore, there is an urgent need for a recognition method for safety behaviors in an industrial control system for gas field to address issues such as high resource occupancy, timeliness, and inaccuracy in safety behavior recognition, in order to enhance the safety defense capability of the industrial control systems of the gas fields and ensure smooth and safe operation of the gas fields.

SUMMARY

The disclosure aims to solve the problems of high resource occupancy, timeliness, and inaccuracy in recognition methods for safety behaviors of industrial control systems in gas fields in existing technologies, and proposes a recognition method for safety behaviors in an industrial control system for a gas field and a system recognition for safety behaviors in an industrial control system for gas field.

To achieve above purpose, the disclosure provides a recognition method for safety behaviors in an industrial control system for a gas field, including:

S1, collecting sample data of the industrial control system, and obtaining an analysis report based on the sample data;

S2, generating a critical application programming interface (API) call dependency graph and a resource dependency graph based on the analysis report;

S3, converting the critical API call dependency graph and the resource dependency graph into numerical matrixes; and S4, constructing a detection model according to the numerical matrixes, and detecting a program abnormal behavior of an industrial control host program based on the detection model, to obtain a recognition result, wherein the recognition result is a normal behavior or an abnormal behavior.

In an embodiment, the generating a critical API call dependency graph includes:

S11, performing a correlation analysis on the analysis report to obtain critical APIs;

S12, generating the critical API call dependency graph of a target sample data of the sample data based on the critical APIs, the target sample data being one of the sample data, including:

S121, obtaining API calls of the target sample data during a running process;

S122, determining whether a target API call of the API calls is one of the critical APIs, the target API call being one of the API calls;

S123, in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the target API call exists in the critical API call dependency graph; and S124, in response to the target API call not existing in the critical API call dependency graph, inputting the target called API into the critical API call dependency graph and determining whether a critical API is obtained before obtaining the target API call; in response to the critical API being not obtained before obtaining the target API call, recording the target API call as a previous critical API, obtaining a next API call of the API calls as the target API call, and jumping to perform the determining whether the target API call of the API calls is one of the critical APIs; or in response to the critical API being obtained before obtaining the target API call, determining the critical API as a previous critical API and determining whether the target API call is as same as the previous critical API; in response to the target API call being as same as the previous critical API, obtaining a next API call of the API calls as a target API call, and jumping to perform the determining whether the target API call of the API calls is one of the critical APIs; or in response to the target API call being not same as the previous critical API, constructing a dependency relationship between the target API call and the previous critical API, thereby updating the critical API call dependency graph; and S13, repeating the S12 to traverse all APIs of the sample data, and thereby generating the critical API call dependency graph.

In an embodiment, the generating a resource dependency graph includes:

S21, obtaining resource information of API parameters operated during a running process recorded by a summary sub node under a behavior node of the analysis report;

S22, generating the resource dependency graph of a target sample data of the sample data based on the API parameter resource information, the target sample data being one of the sample data, including:

S221, obtaining API calls of the target sample data during the running process;

S222, determining whether a target API call of the API calls is one of the critical APIs, the target API call being one of the API calls;

S223, in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the API parameter resource information exists in API parameters of the target API call; in response to the API parameter resource information not existing in the API parameters of the target API call, skipping the target API call and obtaining a next API call of the API calls as a target API call, and jumping to perform the determining whether the target API call of the API calls is one of the critical APIs; in response to the API parameter resource information existing in the API parameters of the target API call, and a resource information list being empty, traversing resource information of the API parameters of the target API call, including:

S224, inputting one resource information of the resource information of the API parameters into the resource information list to obtain the resource information list of the target API call; determining whether the one resource information of the resource information of the API parameters exists in the resource dependency graph; in response to the one resource information of the resource information of the API parameter not existing in the resource dependency graph, inputting the one resource information into the resource dependency graph; after traversing the resource information of the API parameters of the target API call, and recording the resource information list of the target API call as a previous resource information list; skipping the target API call, and obtaining a next API call as a target API call, and jumping to perform the determining whether the target API call of the API calls is one of the critical API to traverse resource information of API parameters of this next API call, to thereby obtain the resource information list of this next API call, combining the resource information list of the next API call with the previous resource information list to form an ordered edge list and inputting the ordered edge list into the resource dependency graph, thereby updating the resource dependency graph; and S23, repeating the S22 to traverse all APIs of the sample data, and thereby generating the resource dependency graph.

In an embodiment, the detection model includes: two convolution layers, a pooling layer, a dropout layer, a flatten layer and two dense layers. Each of the two convolution layers includes sixteen channels, and each convolution kernel of the convolution layer is a 2×2 matrix.

The disclosure further provides a recognition system for safety behaviors in an industrial control system for a gas field including a collection unit, a generation unit, a conversion unit, a recognition unit. The collection unit is configured to collect sample data, and obtain an analysis report based on the sample data. The generation unit is configured to generate an API call dependency graph and a resource dependency graph based on the analysis report. The conversion unit is configured to convert the critical API call dependency graph and the resource dependency graph into numerical matrixes. The recognition unit is configured to construct a detection model according to the numerical matrixes, and detect a program abnormal behavior of an industrial control host program based on the detection model, to obtain a recognition result, where the recognition result is a normal behavior or an abnormal behavior.

In an embodiment, a process of generating the critical API call dependency graph by the generation unit includes:

S11, performing a correlation analysis on the analysis report to obtain critical APIs;

S12, generating the critical API call dependency graph of a target sample data of the sample data based on the critical APIs, the target sample data being one of the sample data, including:

S121, obtaining API calls of the target sample data during a running process;

S122, determining whether a target API call of the API calls is one of the critical APIs, the target API call being one of the API calls;

S123, in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the target API call exists in the critical API call dependency graph; and S124, in response to the target API call not existing in the critical API call dependency graph, inputting the target called API into the critical API call dependency graph and determining whether a critical API is obtained before obtaining the target API call; in response to the critical API being not obtained before obtaining the target API call, recording the target API call as a previous critical API, obtaining a next API call of the API calls as the target API call, and jumping to perform the determining whether the target API call of the API calls is one of the critical APIs; or in response to the critical API being obtained before obtaining the target API call, determining the critical API as a previous critical API and determining whether the target API call is as same as the previous critical API; in response to the target API call being as same as the previous critical API, obtaining a next API call of the API calls as a target API call, and jumping to perform the determining whether the target API call of the API calls is one of the critical APIs; or in response to the target API call being not same as the previous critical API, constructing a dependency relationship between the target API call and the previous critical API, thereby updating the critical API call dependency graph; and S13, repeating the S12 to traverse all APIs of the sample data, and thereby generating the critical API call dependency graph.

In an embodiment, a process of generating the resource dependency graph by the generation unit includes:

S21, obtaining resource information of API parameters operated during the running process recorded by a summary sub node under a behavior node of the analysis report;

S22, generating the resource dependency graph of a target sample data of the sample data based on the API parameter resource information, the target sample data being one of the sample data, including:

S221, obtaining API calls of the target sample data during the running process;

S222, determining whether a target API call of the API calls is one of the critical APIs, the target API call being one of the API calls;

S223, in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the API parameter resource information exists in API parameters of the target API call; in response to the API parameter resource information not existing in the API parameters of the target API call, skipping the target API call and obtaining a next API call of the API calls as a target API call, and jumping to perform the determining whether the target API call of the API calls is one of the critical APIs; in response to the API parameter resource information existing in the API parameters of the target API call, and a resource information list being empty, traversing resource information of the API parameters of the target API call, including:

S224, inputting one resource information of the resource information of the API parameters into the resource information list to obtain the resource information list of the target API call; determining whether the one resource information of the resource information of the API parameters exists in the resource dependency graph; in response to the one resource information of the resource information of the API parameter not existing in the resource dependency graph, inputting the one resource information into the resource dependency graph; after traversing the resource information of the API parameters of the target API call, and recording the resource information list of the target API call as a previous resource information list; skipping the target API call, and obtaining a next API call as a target API call, and jumping to perform the determining whether the target API call of the API calls is one of the critical API to traverse resource information of API parameters of this next API call, to thereby obtain the resource information list of this next API call, combining the resource information list of the next API call with the previous resource information list to form an ordered edge list and inputting the ordered edge list into the resource dependency graph, thereby updating the resource dependency graph; and S23, repeating the S22, after performing API of the sample data, generating the resource dependency graph.

In an embodiment, the detection model includes: two convolution layers, a pooling layer, a dropout layer, a flatten layer and two dense layers. Each of the two convolution layers includes sixteen channels, and each convolution kernel of the convolution layer is a 2×2 matrix.

Compared with the related art, the beneficial effects of the disclosure are as follows.

After extracting the API call dependency graph and the resource dependency graph of the sample program, the recognition method proposed in the disclosure first embeds the API call dependency graph and the resource dependency graph separately, and then inputs the obtained numerical matrixes separately into the detection model of base behavior for training and effectiveness of the obtained numerical matrixes is tested with unknown samples. Finally, the embedded API dependency graph and the embedded resource dependency graph are stacked to form a dual channel input feature for one-time input into the detection model for training and checking their effectiveness. Through experimental verification, the detection model is evaluated from four aspects: false positive rate, true positive rate, detection accuracy, and FI score. The results show that the recognition method proposed in the disclosure is effective, with a detection accuracy of over 98% and a false alarm rate of only 1.54%.

BRIEF DESCRIPTION OF DRAWING

The following will provide a clear and complete description of the technical solution in the embodiments of the disclosure, in conjunction with the attached drawing. Apparently, the described embodiments are only a part of the embodiments of the disclosure, not all of them. Based on the embodiments in the disclosure, all other embodiments obtained by those skilled in the art without creative labor fall within the scope of protection of the disclosure.

Figure is a flowchart diagram of a recognition method for safety behaviors in an industrial control system for a gas field in embodiments of the disclosure.

DETAILED DESCRIPTION OF EMBODIMENTS

The following will provide a clear and complete description of the technical solution in the embodiments of the disclosure, in conjunction with the attached drawing. Apparently, the described embodiments are only a part of the embodiments of the disclosure, not all of them. Based on the embodiments in the disclosure, all other embodiments obtained by those skilled in the art without creative labor fall within the scope of protection of the disclosure.

In order to make the above objectives, features, and advantages of the disclosure more obvious and understandable, further detailed explanations of the disclosure will be provided below in conjunction with the attached drawing and specific embodiments.

Embodiment 1

As shown in the figure, a recognition method for safety behaviors in an industrial control system for gas field provided by the disclosure includes the following steps S1, S2, S3, and S4.

In the S1, sample data are collected, and then an analysis report is obtained based on the sample data. In the embodiment, the sample data include malicious samples and benign samples. The malicious samples are collected online, and the benign samples are collected from local secure machines. And the sample data are divided into: original samples and detection samples, the original samples and the detection samples both include the malicious samples and the benign samples. The original samples and the detection samples are submitted to a Cuckoo for a dynamic operation, and the REST API provided by the Cuckoo is used to automatically obtain the analysis reports of the original samples and the detection samples.

In the S2, a critical API call dependency graph and a resource dependency graph are generated based on the analysis report. In the embodiment, the generating a critical API call dependency graph includes: S11, S12 and S13.

In the S11, a correlation analysis is performed by using a method in MACSPMDAPI between a specified API and a specified category of files based on the analysis report to obtain critical APIs.

In the S12, a critical API call dependency graph of a target sample data of the sample data is generated based on the critical APIs, the target sample data is one of the sample data, which includes:

S121, obtaining API calls of the target sample data during a running process;

S122, determining whether a target API call of the API calls is one of the critical APIs, the target API call being one of the API calls;

S123, in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the target API call exists in the critical API call dependency graph; and S124, in response to the target API call not existing in the critical API call dependency graph, inputting the target called API into the critical API call dependency graph and determining whether a critical API is obtained before obtaining the target API call; in response to the critical API being not obtained before obtaining the target API call, recording the target API call as a previous critical API, obtaining a next API call of the API calls as the target API call, and jumping to perform the determining whether the target API call of the API calls is one of the critical APIs; or in response to the critical API being obtained before obtaining the target API call, determining the critical API as a previous critical API and determining whether the target API call is as same as the previous critical API; in response to the target API call being as same as the previous critical API, obtaining a next API call of the API calls as a target API call, and jumping to perform the determining whether the target API call of the API calls is one of the critical APIs; or in response to the target API call being not same as the previous critical API, constructing a dependency relationship between the target API call and the previous critical API, thereby updating the critical API call dependency graph.

In the S13, the S12 is repeated to traverse all APIs of the sample data, and thereby generating the critical API call dependency graph.

The resource dependency graph is constructed by finding the resource information of API operations from API call parameters, and then the dependency relationship is called in the same order to construct the resource dependency graph. Specifically, the generating a resource dependency graph includes: S21, S22 and S23.

In the S21, resource information of API parameters operated during the running process recorded by a summary sub node under a behavior node of the analysis report is obtained.

In the S22, a resource dependency graph of a target sample data of the sample data is generated based on the API parameter resource information, the target sample data is one of the sample data, which includes:

S221, obtaining API calls of the target sample data during the running process;

S222, determining whether a target API call of the API calls is one of the critical APIs, the target API call being one of the API calls;

S223, in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the API parameter resource information exists in API parameters of the target API call; in response to the API parameter resource information not existing in the API parameters of the target API call, skipping the target API call and obtaining a next API call of the API calls as a target API call, and jumping to perform the determining whether the target API call of the API calls is one of the critical APIs; in response to the API parameter resource information existing in the API parameters of the target API call, and a resource information list being empty, traversing resource information of the API parameters of the target API call, including:

S224, inputting one resource information of the resource information of the API parameters into the resource information list to obtain the resource information list of the target API call; determining whether the one resource information of the resource information of the API parameters exists in the resource dependency graph; in response to the one resource information of the resource information of the API parameter not existing in the resource dependency graph, inputting the one resource information into the resource dependency graph; after traversing the resource information of the API parameters of the target API call, and recording the resource information list of the target API call as a previous resource information list; skipping the target API call, and obtaining a next API call as a target API call, and jumping to perform the determining whether the target API call of the API calls is one of the critical API to traverse resource information of API parameters of this next API call, to thereby obtain the resource information list of this next API call, combining the resource information list of the next API call with the previous resource information list to form an ordered edge list and inputting the ordered edge list into the resource dependency graph, thereby updating the resource dependency graph.

In the S23, the S22 is repeated to traverse all APIs of the sample data, and thereby generating the resource dependency graph.

In the embodiment, the construction method of the resource dependency graph is similar to that of the critical API call dependency graph, and is completed along with the generation process of the critical API call dependency graph. However, when constructing a resource dependency graph, there may be multiple resource information associated with the critical API. Therefore, when constructing a resource dependency graph, the previous extracted resource information and the current extracted resource information are represented by a resource set, and each resource information in the previous resource set will form a dependency relationship with each resource information in the current resource set.

In the S3, the critical API call dependency graph and the resource dependency graph are converted into numerical matrixes.

The working process of the conversion unit includes: the critical API call dependency graph and the resource dependency graph are obtained through the generation unit. Due to the possibility of inconsistent nodes and edges in the dependency graph of each sample program, each dependency graph is converted into a 252×64 numerical matrix through a SDNE embedding structure in the embodiment.

In the embodiment, the SDNE embedding structure requires 252 input neurons, which need to be encoded through two hidden layers to obtain a 64 dimensional embedding vector. However, the generated critical API call dependency graphs may have fewer than 252 nodes. Therefore, before embedding the graph, it is necessary to insert other APIs that have not appeared in the dependency graph into the critical API call dependency graph, so that the number of nodes in the dependency graph reaches 252, so as to obtain a dimensionally consistent embedding matrix. When embedding the resource dependency graph, the resource dependency graph is directly embedded. After the embedding, rows from the output embedding matrix are extracted one by one and the extracted rows are inserted into a new 252×64 numerical matrix. If the output embedding matrix is less than 252 rows, the new matrix will set the extra rows to 0. If the number of rows in the output embedding matrix is greater than 252, the excess rows in the embedding matrix are ignored, and only the 252 rows are retained. This ensures that after embedding the resource dependency graph into the graph, the numerical matrix with the same dimension as the critical API call dependency graph is obtained.

In the S4, a detection model is constructed according to the numerical matrixes, and a program abnormal behavior of an industrial control host program is detected based on the detection model to obtain a recognition result, the recognition result is a normal behavior and an abnormal behavior.

In the embodiment, the detection model includes: two convolution layers, a pooling layer, a dropout layer, a flatten layer and two dense layers. A first convolution layer includes sixteen channels, no padding is applied to the input of the channels, and each convolution kernel of the first convolution layer is a 2×2 matrix. A second convolution layer has the same configuration as the first convolution layer, and also output a 16 channel result. The output on each channel of the second convolution layer will be reduced by one unit in each direction, resulting in an output like (250, 62, 16). Each channel of the second convolution layer is immediately followed by a max pooling layer with a window of (2, 2), which reduces each channel of the second convolution layer by half in all directions without affecting the input channel. Therefore, after passing through the pooling layer, the output takes the form of (125, 31, 16). The flatten layer flats the output result of the pooling layer into a one-dimensional vector with 62000(250×62×16). The final detection result is obtained by passing the one-dimensional vector through a first dense layer with sixteen neurons and the output layer (i.e. a second dense layer) with a neuron.

The detection model is trained by using the numerical matrixes of the original samples as the training samples, and use the numerical matrix of the detection samples to detect the trained detection model, thereby obtaining the final detection model. The final detection model is used to identify program abnormal behavior in the industrial control host program, and thereby obtaining recognition results. In this embodiment, the identification results include: the normal behavior and the abnormal behavior.

Embodiment 2

A recognition system for safety behaviors in an industrial control system for a gas field provided by the disclosure includes a collection unit, a generation unit, a conversion unit and a recognition unit. The collection unit is configured to collect sample data from samples, and obtain an analysis report based on the sample data.

In the embodiment, the sample data include malicious samples and benign samples. The malicious samples are collected online, and the benign samples are collected from local secure machines. And the sample data are divided into: original samples and detection samples, the original samples and the detection samples both include the malicious samples and the benign samples. The original samples and the detection samples are submitted to a Cuckoo for a dynamic operation, and the REST API provided by the Cuckoo is used to automatically obtain the analysis reports of the original samples and the detection samples.

The generation unit is configured to generate an API call dependency graph and a resource dependency graph based on the analysis report. In the embodiment, a process of generating the critical API call dependency graph by the generation unit includes: S11, S12 and S13.

In the S11, a correlation analysis is performed by using a method in MACSPMDAPI between a specified API and a specified category of files based on the analysis report to obtain critical APIs.

In the S12, a critical API call dependency graph of a target sample data of the sample data is generated based on the critical APIs, the target sample data is one of the sample data, which includes:

S121, obtaining API calls of the target sample data during a running process;

S122, determining whether a target API call of the API calls is one of the critical APIs, the target API call being one of the API calls;

S123, in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the target API call exists in the critical API call dependency graph; and S124, in response to the target API call not existing in the critical API call dependency graph, inputting the target called API into the critical API call dependency graph and determining whether a critical API is obtained before obtaining the target API call; in response to the critical API being not obtained before obtaining the target API call, recording the target API call as a previous critical API, obtaining a next API call of the API calls as the target API call, and jumping to perform the determining whether the target API call of the API calls is one of the critical APIs; or in response to the critical API being obtained before obtaining the target API call, determining the critical API as a previous critical API and determining whether the target API call is as same as the previous critical API; in response to the target API call being as same as the previous critical API, obtaining a next API call of the API calls as a target API call, and jumping to perform the determining whether the target API call of the API calls is one of the critical APIs; or in response to the target API call being not same as the previous critical API, constructing a dependency relationship between the target API call and the previous critical API, thereby updating the critical API call dependency graph.

In the S13, the S12 is repeated to traverse all APIs of the sample data, and thereby generating the critical API call dependency graph.

The resource dependency graph is constructed by finding the resource information of API operations from API call parameters, and then the dependency relationship is called in the same order to construct the resource dependency graph. Specifically, a process of generating the resource dependency graph by the generation unit includes: S21, S22 and S23.

In the S21, resource information of API parameters operated during the running process recorded by a summary sub node under a behavior node of the analysis report is obtained.

In the S22, a resource dependency graph of a target sample data of the sample data is generated based on the API parameter resource information, the target sample data is one of the sample data, which includes:

S221, obtaining API calls of the target sample data during the running process;

S222, determining whether a target API call of the API calls is one of the critical APIs, the target API call being one of the API calls;

S223, in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the API parameter resource information exists in API parameters of the target API call; in response to the API parameter resource information not existing in the API parameters of the target API call, skipping the target API call and obtaining a next API call of the API calls as a target API call, and jumping to perform the determining whether the target API call of the API calls is one of the critical APIs; in response to the API parameter resource information existing in the API parameters of the target API call, and a resource information list being empty, traversing resource information of the API parameters of the target API call, including:

S224, inputting one resource information of the resource information of the API parameters into the resource information list to obtain the resource information list of the target API call; determining whether the one resource information of the resource information of the API parameters exists in the resource dependency graph; in response to the one resource information of the resource information of the API parameter not existing in the resource dependency graph, inputting the one resource information into the resource dependency graph; after traversing the resource information of the API parameters of the target API call, and recording the resource information list of the target API call as a previous resource information list; skipping the target API call, and obtaining a next API call as a target API call, and jumping to perform the determining whether the target API call of the API calls is one of the critical API to traverse resource information of API parameters of this next API call, to thereby obtain the resource information list of this next API call, combining the resource information list of the next API call with the previous resource information list to form an ordered edge list and inputting the ordered edge list into the resource dependency graph, thereby updating the resource dependency graph.

In the S23, the S22 is repeated to traverse all APIs of the sample data, and thereby generating the resource dependency graph.

In the embodiment, the construction method of the resource dependency graph is similar to that of the critical API call dependency graph, and is completed along with the generation process of the critical API call dependency graph. However, when constructing a resource dependency graph, there may be multiple resource information associated with the critical API. Therefore, when constructing a resource dependency graph, the previous extracted resource information and the current extracted resource information are represented by a resource set, and each resource information in the previous resource set will form a dependency relationship with each resource information in the current resource set.

The conversion unit is configured to convert the critical API call dependency graph and the resource dependency graph into numerical matrixes.

The critical API call dependency graph and the resource dependency graph are obtained through the above steps. Due to the possibility of inconsistent nodes and edges in the dependency graph of each sample program, each dependency graph is converted into a 252×64 numerical matrix through a SDNE embedding structure in the embodiment.

In the embodiment, the SDNE embedding structure requires 252 input neurons, which need to be encoded through two hidden layers to obtain a 64 dimensional embedding vector. However, the generated critical API call dependency graphs may have fewer than 252 nodes. Therefore, before embedding the graph, it is necessary to insert other APIs that have not appeared in the dependency graph into the critical API call dependency graph, so that the number of nodes in the dependency graph reaches 252, so as to obtain a dimensionally consistent embedding matrix. When embedding the resource dependency graph, the resource dependency graph is directly embedded. After the embedding, rows from the output embedding matrix are extracted one by one and the extracted rows are inserted into a new 252×64 numerical matrix. If the output embedding matrix is less than 252 rows, the new matrix will set the extra rows to 0. If the number of rows in the output embedding matrix is greater than 252, the excess rows in the embedding matrix are ignored, and only the 252 rows are retained. This ensures that after embedding the resource dependency graph into the graph, the numerical matrix with the same dimension as the critical API call dependency graph is obtained.

The recognition unit is configured to construct a detection model according to the numerical matrixes, and detect a program abnormal behavior of an industrial control host program based on the detection model to obtain a recognition result, and the recognition result is a normal behavior and an abnormal behavior.

In the embodiment, the detection model includes: two convolution layers, a pooling layer, a dropout layer, a flatten layer and two dense layers. A first convolution layer includes sixteen channels, no padding is applied to the input of the channels, and each convolution kernel of the first convolution layer is a 2×2 matrix. A second convolution layer has the same configuration as the first convolution layer, and also output a 16 channel result. The output on each channel of the second convolution layer will be reduced by one unit in each direction, resulting in an output like (250, 62, 16). Each channel of the second convolution layer is immediately followed by a max pooling layer with a window of (2, 2), which reduces each channel of the second convolution layer by half in all directions without affecting the input channel.

Therefore, after passing through the pooling layer, the output takes the form of (125, 31, 16). The flatten layer flats the output result of the pooling layer into a one-dimensional vector with 62000(250×62×16). The final detection result is obtained by passing the one-dimensional vector through a first dense layer with sixteen neurons and the output layer (i.e. a second dense layer) with a neuron.

The detection model is trained by using the numerical matrixes of the original samples as the training samples, and use the numerical matrix of the detection samples to detect the trained detection model, thereby obtaining the final detection model. The final detection model is used to identify program abnormal behavior in the industrial control host program, and thereby obtaining recognition results. In this embodiment, the recognition result is a normal behavior and an abnormal behavior.

In an embodiment, each of the collection unit, the generation unit, the conversion unit and the recognition unit is embedded by software stored in at-least one memory and executable by at least one processor.

In an embodiment, the recognition method includes: applying the recognition result in safety defense guidance of the industrial control system to ensure the stable and safe operation of the gas field, and thereby controlling, by an administrator of the industrial control system, the industrial control system based on the recognition result.

In an embodiment, the recognition method is implemented by a recognition device including a processor and a memory with a recognition application stored therein. The recognition application, when executed by the processor, is configured to implement the recognition method and is further configured to send, over the Internet, the recognition result to a mobile terminal of an administrator of the industrial control system. An application installed in the mobile terminal is configured to receive the recognition result, and display the recognition result on the mobile terminal to assist the administrator to control the industrial control system based on the recognition result.

The above embodiments are only a description of the specific method of the disclosure, and do not limit the scope of the disclosure. Without departing from the design spirit of the disclosure, all variations and improvements made by those skilled in the art to the technical solution of the disclosure should fall within the scope of protection determined by the claims of the disclosure.

What is claimed is:

1. A recognition method for safety behaviors in an industrial control system for a gas field, comprising:
    S1, collecting sample data of the industrial control system, and obtaining an analysis report based on the sample data;
    S2, generating a critical application programming interface (API) call dependency graph and a resource dependency graph based on the analysis report;
    S3, converting the critical API call dependency graph and the resource dependency graph into numerical matrixes; and
    S4, constructing a detection model according to the numerical matrixes, and detecting a program abnormal behavior of an industrial control host program based on the detection model, to obtain a recognition result, wherein the recognition result is a normal behavior or an abnormal behavior;
    wherein the generating a critical API call dependency graph comprises:
        S11, performing a correlation analysis on the analysis report to obtain critical APIs;
        S12, generating the critical API call dependency graph of a target sample data of the sample data based on the critical APIs, the target sample data being one of the sample data, comprising:
            obtaining API calls of the target sample data during a running process;
            determining whether a target API call of the API calls is one of the critical APIs, the target API call being one of the API calls;
                in response to the target API call being not one of the critical APIs, skipping the target API call and obtaining a next API call of the API calls as a target API call, and jumping to perform the determining whether the target API call of the API calls is one of the critical APIs; or,
                in response to the target API call being one of the critical APIs, determining whether the target API call exists in the critical API call dependency graph;
                    in response to the target API call not existing in the critical API call dependency graph, inputting the target called API into the critical API call dependency graph and determining whether a critical API is obtained before obtaining the target API call;
                    in response to the critical API being not obtained before obtaining the target API call, recording the target API call as a previous critical API, obtaining a next API call of the API calls as the target API call, and jumping to perform the determining whether the target API call of the API calls is one of the critical APIs; or
                    in response to the critical API being obtained before obtaining the target API call, determining the critical API as a previous critical API and determining whether the target API call is as same as the previous critical API;
                    in response to the target API call being as same as the previous critical API, obtaining a next API call of the API calls as a target API call, and jumping to perform the determining whether the target API call of the API calls is one of the critical APIs; or
                    in response to the target API call being not same as the previous critical API, constructing a dependency relationship between the target API call and the previous critical API, thereby updating the critical API call dependency graph; and
        S13, repeating the S12 to traverse all APIs of the sample data, and thereby generating the critical API call dependency graph;
    wherein the generating a resource dependency graph comprises:
        S21, obtaining API parameter resource information operated during the running process recorded by a summary sub node under a behavior node of the analysis report;
        S22, generating the resource dependency graph of a target sample data of the sample data based on the API parameter resource information, the target sample data being one of the sample data, comprising:
            obtaining API calls of the target sample data during the running process;

determining whether a target API call of the API calls is one of the critical APIs, the target API call being one of the API calls;
in response to the target API call being not one of the critical APIs, skipping the target API call and obtaining a next API call of the API calls as a target API call, and jumping to perform the determining whether the target API call of the API calls is one of the critical APIs; or,
in response to the target API call being one of the critical APIs, determining whether the API parameter resource information exists in API parameters of the target API call;
in response to the API parameter resource information not existing in the API parameters of the target API call, skipping the target API call and obtaining a next API call of the API calls as a target API call, and jumping to perform the determining whether the target API call of the API calls is one of the critical APIs;
in response to the API parameter resource information existing in the API parameters of the target API call, and a resource information list being empty, traversing resource information of the API parameters of the target API call, comprising:
inputting one resource information of the resource information of the API parameters into the resource information list to obtain the resource information list of the target API call; determining whether the one resource information of the resource information of the API parameters exists in the resource dependency graph;
in response to the one resource information of the resource information of the API parameter not existing in the resource dependency graph, inputting the one resource information into the resource dependency graph;
after traversing the resource information of the API parameters of the target API call, and recording the resource information list of the target API call as a previous resource information list; skipping the target API call, and obtaining a next API call as a target API call, and jumping to perform the determining whether the target API call of the API calls is one of the critical API to traverse resource information of API parameters of this next API call, to thereby obtain the resource information list of this next API call, combining the resource information list of the next API call with the previous resource information list to form an ordered edge list and inputting the ordered edge list into the resource dependency graph, thereby updating the resource dependency graph; and
S23, repeating the S22 to traverse the all APIs of the sample data, and thereby generating the resource dependency graph;
wherein the recognition method further comprises: applying the recognition result in safety defense guidance of the industrial control system to ensure stable and safe operation of the gas field, and thereby controlling, by an administrator of the industrial control system, the industrial control system based on the recognition result to determine potential threats of the industrial control host program and eliminate the potential threats to thereby repair the industrial control host program.

2. The recognition method for the safety behaviors in the industrial control system for the gas field as claimed in claim 1, wherein the detection model comprises: two convolution layers, a pooling layer, a dropout layer, a flatten layer and two dense layers;
wherein each convolution layer of the two convolution layers comprises sixteen channels, each convolution kernel of the convolution layer is a 2×2 matrix.

3. A recognition system for safety behaviors in an industrial control system for a gas field comprising: a collection unit, a generation unit, a conversion unit, a recognition unit;
wherein the collection unit is configured to collect sample data from samples, and obtain an analysis report is obtained based on the sample data;
wherein the generation unit is configured to generate a API call dependency graph and a resource dependency graph based on the analysis report;
wherein the conversion unit is configured to convert the critical API call dependency graph and the resource dependency graph into numerical matrixes;
wherein the recognition unit is configured to construct a detection model according to the numerical matrixes, and a program abnormal behavior of an industrial control host program is detected based on the detection model to obtain a recognition result, and the recognition result is a normal behavior or an abnormal behavior;
wherein the generating a critical API call dependency graph comprises:
S11, performing a correlation analysis on the analysis report to obtain critical APIs;
S12, generating the critical API call dependency graph of a target sample data of the sample data based on the critical APIs, the target sample data being one of the sample data, comprising:
obtaining API calls of the target sample data during a running process;
determining whether a target API call of the API calls is one of the critical APIs, the target API call being one of the API calls;
in response to the target API call being not one of the critical APIs, skipping the target API call and obtaining a next API call of the API calls as a target API call, and jumping to perform the determining whether the target API call of the API calls is one of the critical APIs; or,
in response to the target API call being one of the critical APIs, determining whether the target API call exists in the critical API call dependency graph;
in response to the target API call not existing in the critical API call dependency graph, inputting the target called API into the critical API call dependency graph and determining whether a critical API is obtained before obtaining the target API call;
in response to the critical API being not obtained before obtaining the target API call, recording the target API call as a previous critical API, obtaining a next API call of the API calls as the target API call, and jumping to perform the determining whether the target API call of the API calls is one of the critical APIs; or in response to the critical API being obtained before obtaining the target API call, determining the critical API as a previous critical API and determining whether the target API call is as same as the previous critical API;

in response to the target API call being as same as the previous critical API, obtaining a next API call of the API calls as a target API call, and jumping to perform the determining whether the target API call of the API calls is one of the critical APIs; or in response to the target API call being not same as the previous critical API, constructing a dependency relationship between the target API call and the previous critical API, thereby updating the critical API call dependency graph; and S13, repeating the S12 to traverse all APIs of the sample data, and thereby generating the critical API call dependency graph;

wherein the generating a resource dependency graph comprises:

S21, obtaining API parameter resource information operated during the running process recorded by a summary sub node under a behavior node of the analysis report;

S22, generating the resource dependency graph of a target sample data of the sample data based on the API parameter resource information, the target sample data being one of the sample data, comprising:

obtaining API calls of the target sample data during the running process;

determining whether a target API call of the API calls is one of the critical APIs, the target API call being one of the API calls;

in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the API parameter resource information exists in API parameters of the target API call;

in response to the API parameter resource information not existing in the API parameters of the target API call, skipping the target API call and obtaining a next API call of the API calls as a target API call, and jumping to perform the determining whether the target API call of the API calls is one of the critical APIs;

in response to the API parameter resource information existing in the API parameters of the target API call, and a resource information list being empty, traversing resource information of the API parameters of the target API call, comprising:

inputting one resource information of the resource information of the API parameters into the resource information list to obtain the resource information list of the target API call;

determining whether the one resource information of the resource information of the API parameters exists in the resource dependency graph;

in response to the one resource information of the resource information of the API parameter not existing in the resource dependency graph, inputting the one resource information into the resource dependency graph;

after traversing the resource information of the API parameters of the target API call, and recording the resource information list of the target API call as a previous resource information list; skipping the target API call, and obtaining a next API call as a target API call, and jumping to perform the determining whether the target API call of the API calls is one of the critical API to traverse resource information of API parameters of this next API call, to thereby obtain the resource information list of this next API call, combining the resource information list of the next API call with the previous resource information list to form an ordered edge list and inputting the ordered edge list into the resource dependency graph, thereby updating the resource dependency graph; and S23, repeating the S22 to traverse the all APIs of the sample data, and thereby generating the resource dependency graph;

wherein the recognition unit is further configured to: in response to obtaining the recognition result being the abnormal behavior, determine potential threats of the industrial control host program and eliminate the potential threats to thereby repair the industrial control host program.

4. The recognition system for the safety behaviors in the industrial control system for the gas field as claimed in claim 3, wherein the detection model comprises: two convolution layers, a pooling layer, a dropout layer, a flatten layer and two dense layers;

wherein each convolution layer of the two convolution layers comprises sixteen channels, each convolution kernel of the convolution layer is a 2×2 matrix.

5. A recognition method for safety behaviors in an industrial control system for a gas field, comprising:

S1, collecting sample data of the industrial control system, and obtaining an analysis report based on the sample data;

S2, generating a critical application programming interface (API) call dependency graph and a resource dependency graph based on the analysis report;

S3, converting the critical API call dependency graph and the resource dependency graph into numerical matrixes;

S4, constructing a detection model according to the numerical matrixes, and detecting a program abnormal behavior of an industrial control host program based on the detection model, to obtain a recognition result, wherein the recognition result is a normal behavior or an abnormal behavior; and S5, in response to obtaining the recognition result being the abnormal behavior, determining potential threats of the industrial control host program and eliminating the potential threats to ensure stable and safe operation of the gas field to thereby repair the industrial control host program;

wherein the generating a critical API call dependency graph comprises:

S11, performing a correlation analysis on the analysis report to obtain critical APIs;

S12, generating the critical API call dependency graph of a target sample data of the sample data based on the critical APIs, the target sample data being one of the sample data, comprising:

obtaining API calls of the target sample data during a running process;

determining whether a target API call of the API calls is one of the critical APIs, the target API call being one of the API calls;

in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the target API call exists in the critical API call dependency graph;

in response to the target API call not existing in the critical API call dependency graph, inputting the target called API into the critical API call dependency graph and determining whether a critical API is obtained before obtaining the target API call;

in response to the critical API being not obtained before obtaining the target API call, recording the target API call as a previous critical API, obtaining a next API call of the API calls as the target API call, and jumping to perform the determining whether the target API call of the API calls is one of the critical APIs; or in response to the critical API being obtained before obtaining the target API call, determining the critical API as a previous critical API and determining whether the target API call is as same as the previous critical API;

in response to the target API call being as same as the previous critical API, obtaining a next API call of the API calls as a target API call, and jumping to perform the determining whether the target API call of the API calls is one of the critical APIs; or in response to the target API call being not same as the previous critical API, constructing a dependency relationship between the target API call and the previous critical API, thereby updating the critical API call dependency graph; and S13, repeating the S12 to traverse all APIs of the sample data, and thereby generating the critical API call dependency graph;

wherein the generating a resource dependency graph comprises:

S21, obtaining API parameter resource information operated during the running process recorded by a summary sub node under a behavior node of the analysis report;

S22, generating the resource dependency graph of a target sample data of the sample data based on the API parameter resource information, the target sample data being one of the sample data, comprising:

obtaining API calls of the target sample data during the running process;

determining whether a target API call of the API calls is one of the critical APIs, the target API call being one of the API calls;

in response to the target API call being not one of the critical APIs, skipping the target API call and obtaining a next API call of the API calls as a target API call, and jumping to perform the determining whether the target API call of the API calls is one of the critical APIs; or, in response to the target API call being one of the critical APIs, determining whether the API parameter resource information exists in API parameters of the target API call;

in response to the API parameter resource information not existing in the API parameters of the target API call, skipping the target API call and obtaining a next API call of the API calls as a target API call, and jumping to perform the determining whether the target API call of the API calls is one of the critical APIs;

in response to the API parameter resource information existing in the API parameters of the target API call, and a resource information list being empty, traversing resource information of the API parameters of the target API call, comprising:

inputting one resource information of the resource information of the API parameters into the resource information list to obtain the resource information list of the target API call;

determining whether the one resource information of the resource information of the API parameters exists in the resource dependency graph;

in response to the one resource information of the resource information of the API parameter not existing in the resource dependency graph, inputting the one resource information into the resource dependency graph;

after traversing the resource information of the API parameters of the target API call, and recording the resource information list of the target API call as a previous resource information list; skipping the target API call, and obtaining a next API call as a target API call, and jumping to perform the determining whether the target API call of the API calls is one of the critical API to traverse resource information of API parameters of this next API call, to thereby obtain the resource information list of this next API call, combining the resource information list of the next API call with the previous resource information list to form an ordered edge list and inputting the ordered edge list into the resource dependency graph, thereby updating the resource dependency graph; and S23, repeating the S22 to traverse the all APIs of the sample data, and thereby generating the resource dependency graph.

* * * * *